United States Patent

[11] 3,547,159

| [72] | Inventor | John D. Bachman |
| | | Box 683, Bristol, Tenn. 37620 |
| [21] | Appl. No. | 734,160 |
| [22] | Filed | June 3, 1968 |
| [45] | Patented | Dec. 15, 1970 |

[54] PNEUMATIC SENSOR DEVICE
4 Claims, 8 Drawing Figs.

[52] U.S. Cl. ............................................. 137/625.62, 137/83
[51] Int. Cl. .............................................. F16k 11/02
[50] Field of Search ................................... 137/82, 83, 625.62

[56] References Cited
UNITED STATES PATENTS

| 3,071,157 | 1/1963 | Robertson et al. | 137/82X |
| 3,098,595 | 7/1963 | Shelton | 137/83X |
| 3,367,351 | 2/1968 | Smyers | 137/83 |

*Primary Examiner*—Henry T. Klinksiek
*Attorney*—Kimmel, Crowell & Weaver

ABSTRACT: Control apparatus for a pneumatic system comprising a normally-closed diaphragm-operated valve controlling a high-pressure air supply to the system, a low-pressure air feedback line connected in said high-pressure air supply for applying an operating pressure on the diaphragm on said valve to move said valve to its open position, said air feedback line including means adjustable to provide the low-pressure air feedback, and normally-closed valve means connected in the air feedback line and operable to move to its open position in response to signal means involving a drop in pressure in said air feedback line.

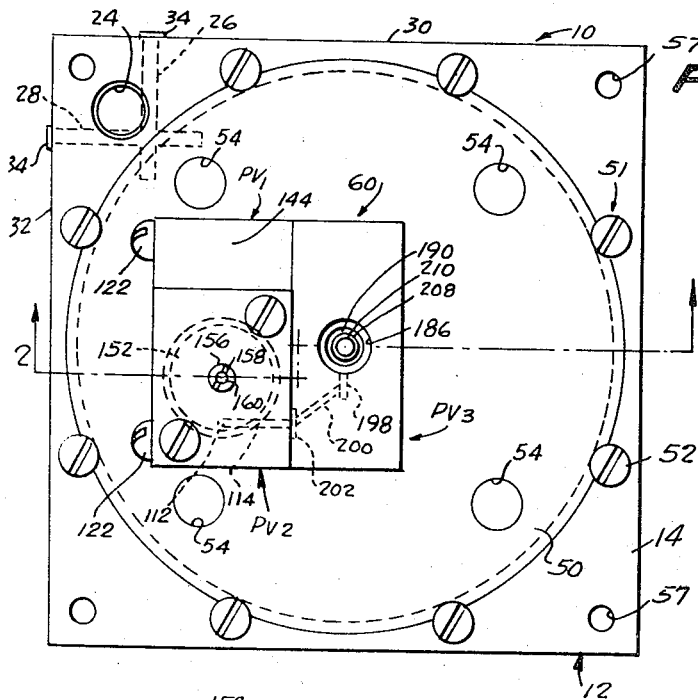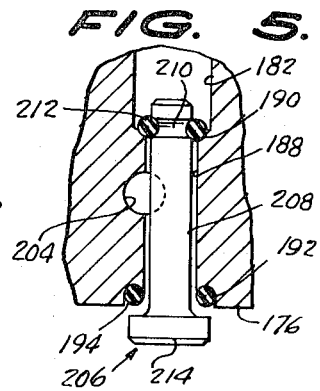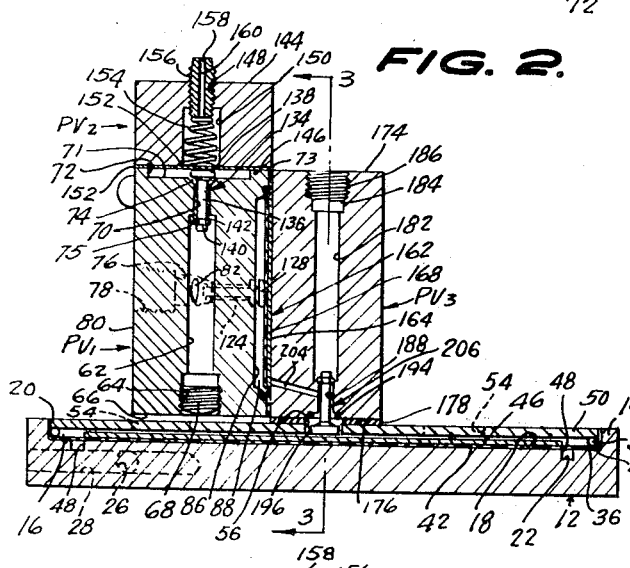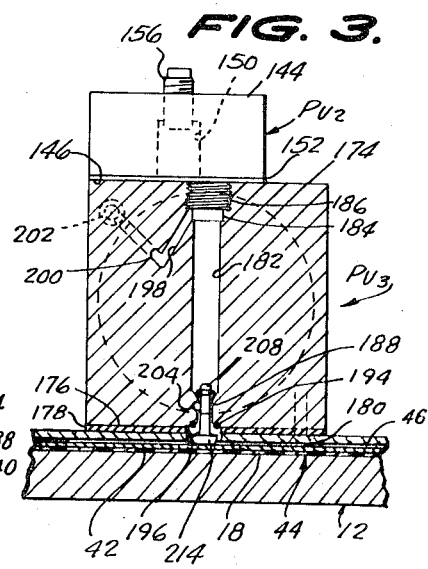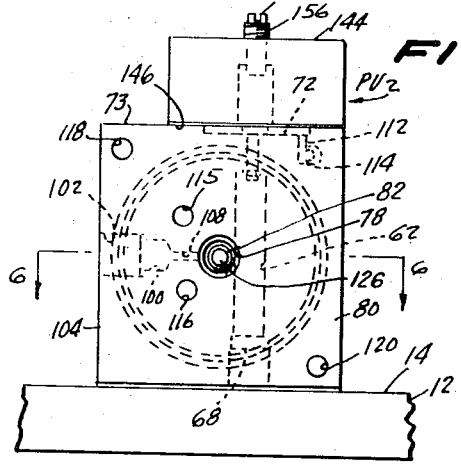
INVENTOR.
JOHN D. BACHMAN,
BY Kimmel, Crowell & Weaver
ATTORNEYS.

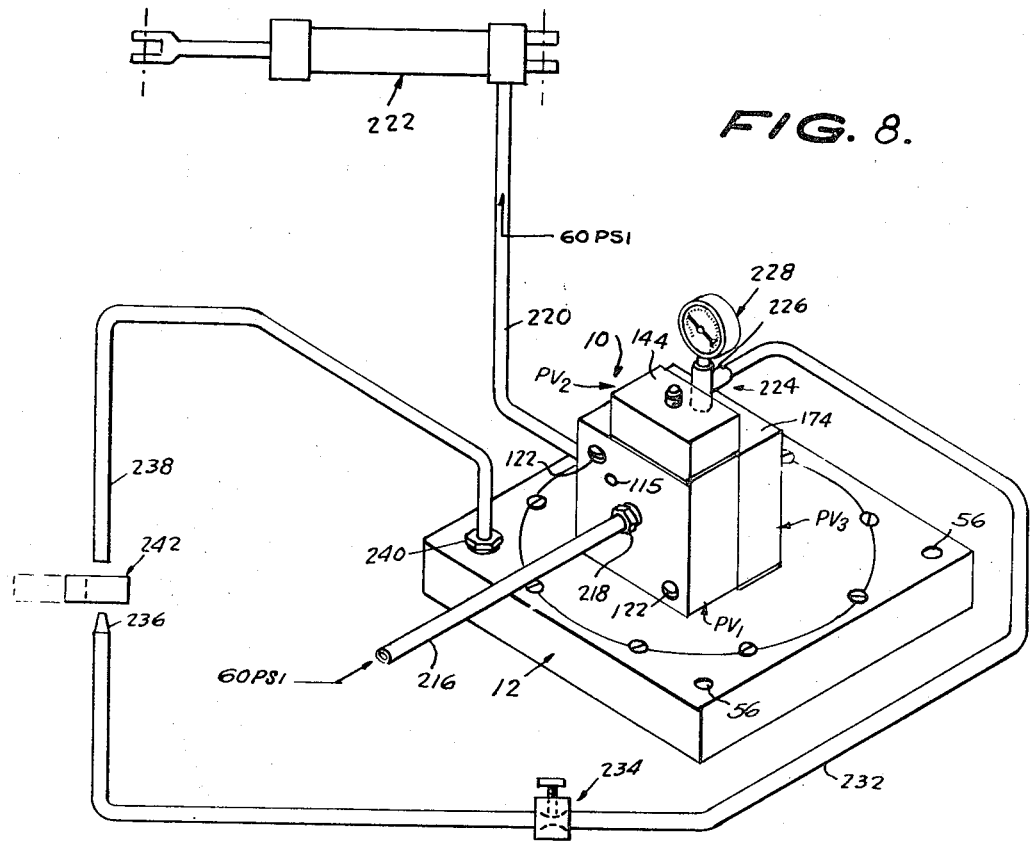
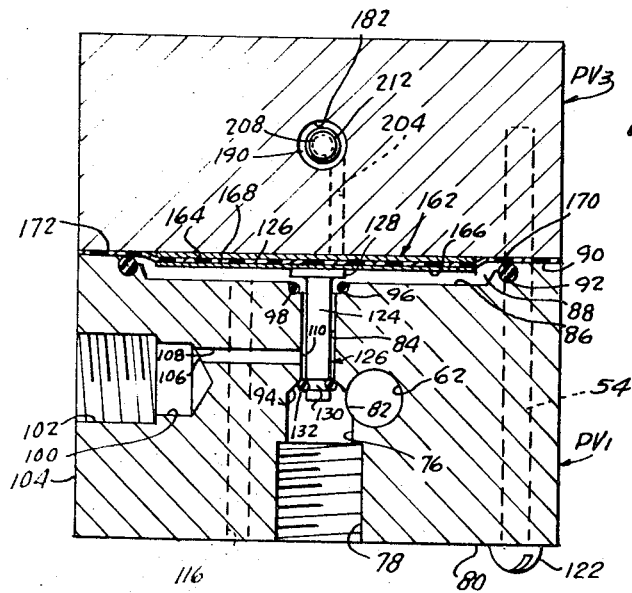
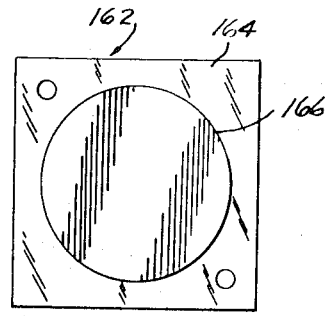

3,547,159

PNEUMATIC SENSOR DEVICE

BACKGROUND OF INVENTION

Control means for machines, equipment and materials are, of course, old and well known in industry, and in more recent years, manufacturers in such fields as textiles, paper, materials handling, packaging, fabrication, apparel manufacture and many others are turning to fluidic systems and such systems require sensitive controls. Control means for fluidic systems operating under relatively high air pressures in the order of, for example, 50 to 100 p.s.i. have been mechanical, and electrical, including photoelectric control circuits, but none have been found to be completely satisfactory in maintaining positive control over the fluidic system associated therewith since most require careful periodic inspection, maintenance and replacement, and many fail to maintain effective control because of the environment in which the same are placed.

It is, therefore, one of the primary objects of this invention to provide control means for a fluidic system wherein the control means is positive in operation and is not subject to the use of external sources of energy for effective operation.

Another object of this invention is to provide a control means for a fluidic system which is not affected by adverse conditions of dust, vibration, color changes and other factors common to the environment in which the control means is employed.

A further object of this invention is to provide a pneumatic sensing device of the interrupted jet-air type for controlling a fluidic system.

It is still a further object of this invention to provide a control means for fluidic system of the interrupted air-jet type and wherein the jet air comprises a low-pressure feedback from the high-pressure source.

This invention contemplates, as a still further object thereof, the provision of control means of the type to which reference has been made generally above, the control means being noncomplex in construction and assembly, inexpensive to manufacture and maintain, rugged and durable in use, and which is positive and sensitive in its operation.

Other and further objects and advantages of the instant invention will become more manifest from a consideration of the following specification when read in conjunction with the drawings annexed hereto.

In the drawings:

FIG. 1 is a top plan view of a pneumatic sensing and fluidic system control device constructed in accordance with this invention;

FIG. 2 is a detail transverse cross-sectional view, FIG. 2 being taken substantially on the vertical plane of line 2–2 of FIG. 1, looking in the direction of the arrows;

FIG. 3 is a fragmentary detail cross-sectional view, FIG. 3 being taken substantially on the vertical plane of line 3–3 of FIG. 2, looking in the direction of the arrows;

FIG. 4 is a side elevational view of the device illustrated in FIG. 1;

FIG. 5 is an enlarged fragmentary detail cross-sectional view, similar to FIG. 4;

FIG. 6 is an enlarged transverse cross-sectional view, FIG. 6 being taken substantially on the vertical plane of line 6–6 of FIG. 4, looking in the direction of the arrows;

FIG. 7 is a top plan view of one of the diaphragms of the control device or unit; and FIG. 8 is a fluidic system employing the valve assembly.

Referring now more specifically to the drawings, reference numeral 10 designates, in general, a pneumatically operated control valve or device for a fluidic system, the control valve or device 10 being constructed in accordance with the teachings of this invention. The control device 10, as will be made more clear below, includes pneumatic sensing means to effect the operation thereof. Thus, and in the embodiment illustrated in the drawings, the valve 10 is seen to comprise a substantially rectangular base 12 which may be formed of any suitable material although in the interests of economy in manufacture and in the field use of the device, it is preferably to form the base 12 of a suitable plastic material. The base 12 includes a side 14, and a centrally located substantially cylindrical recess 16 extends inwardly therefrom and terminates in an inner end wall 18. In forming the recess 16 there is inherently provided a sidewall 20, and spaced inwardly from the sidewall 20 and extending from the bottom wall 18 is an upwardly opening substantially U-shaped annular groove 22 concentric with respect to the recess 16. The base 12, adjacent a corner thereof, is formed with an enlarged internally threaded blind passageway 24 (see FIG. 1) which extends inwardly from the side 14 and is in open communication with a pair of intersecting passages 26, 28, the latter having a pair of adjacent ends opening into the annular groove 22. The opposed ends of the passages 26, 28, for construction purposes and for protection against air pressure overloads, are suitably sealed by relatively thin easily rupturable air-impervious plastic blowout patches 34 which may be adhesively or otherwise secured to the base 12.

The annular ares disposed between the groove 22 and the adjacent inner surface of the sidewall 20 defines a shoulder 36 on which is superimposed an O-ring seal 38. The seal 38, in turn, is superimposed over the circumferential marginal edge 40 of a substantially flat thin flexible plastic cylindrical membrane 42 having sufficient slack therein so as to permit one side of the main body portion 44 thereof to lie substantially flush against the bottom wall 18 and to span the groove 22 under one operating condition of the valve control means 10 to be describe in detail below.

A thin lightweight metallic cylindrical diaphragm 46 is superimposed over and is secured to the other side of the main body portion 44, the diameter of the diaphragm 46 being substantially the same diameter as the diameter of the inner wall 48 of the groove 22. A substantially cylindrical mounting plate 50 is telescopically received within the recess 16, the plate 50 having its circumferential marginal edge at the underside thereof engaging the seal 38. A plurality of circumferentially spaced holddown screws 51 are threaded into the base 12 adjacent the recess 16, the screws having enlarged heads 52 of which a portion of each overhangs a confronting portion of the plate 50 and engages the same whereby tightening of the screws 51 causes the plate 50 to move downwardly in the direction of the seal 38 and to tightly clamp the circumferential marginal edge of the membrane 42 therebetween. The plate 50 is also provided with a plurality of transversely extending vent openings 54 and a substantially centrally located transversely extending opening 56 to which further reference will be made below.

The base 12 may be further provided with suitable openings 57 extending transversely therethrough to receive fastening means conventional in the art for securing the base to a suitable support at any desired site.

The control valve 10 further comprises a poppet valve assembly which includes a valve body the three substantially rectangular blocks here identified by the reference characters $PV_1$, $PV_2$ and $PV_3$ connected together as a valve assembly having the general reference numeral 60, these blocks preferably but not necessarily being formed of a clear transparent plastic material.

The block $PV_1$ is formed with a first bore 62 which, and relating the same to the several FIGS. of the drawings for reference purposes only, extends upright and vertically with respect to the upper side 14 of the base 12, the side 14 being assumed to be disposed in a substantially horizontal plane. The lower end of the first bore 62 opens into one end of an enlarged internally threaded counterbore 64, the other end of the latter opening into the plane of the lower end 66 of the block $PV_1$. The counterbore 64 is normally closed by an externally threaded screwplug 68. The upper end of the first bore 62 is reduced in diameter to provide a coaxially aligned hollow throat 70 which, at its upper and outer end, is in open communication with the closed end 71 of a relatively shallow hollow cylindrical recess 72. The upper end of the recess 72 opens in the plane of the upper end 73 of the block $PV_1$. To serve a function to be described, the upper end of the throat 70 is counterbored to form a valve seat 74, and at its lower end, the throat 70 is shouldered at 75.

The block $PV_1$ is further formed with a high-pressure air inlet second bore 76 having an internally threaded counterbore 78 which opens into the plane of the side 80 of the aforementioned block. The unthreaded inner end of the second bore 76 opens through a port 82 into the first bore 62. The inner end of the second bore 76 is reduced in diameter to form an elongated throat 84 coaxial therewith and which opens at its outer end into the plane of the closed end 86 of a substantially hollow cylindrical recess 88 (see FIG. 6), and the outer end of the recess 88 opens into the plane of the opposed side 90 of the block $PV_1$. The block $PV_1$ adjacent the outer peripheral marginal edge of the recess 88 is formed with an outwardly opening annular seat 92 to serve a function to be described.

The communication between the adjacent inner ends of the first bore 76 of the block $PV_1$ and the throat 84 includes an intermediate connecting portion 94 having a hollow frustoconical configuration and serves as a valve seat for a purpose and a function to be described. The throat 84 adjacent its other or outer end is enlarged to provide a hollow outwardly opening annular seat 96 in which is seated an annular valve seating gasket 98.

At 100 is designated a high-pressure air outlet third bore for the block $PV_1$, the bore 100 having an enlarged outer internally threaded counterbore 102 which opens at its outer end into the plane of the edge 104 of the block $PV_1$. The inner end of the bore 100 is in open communication, through port 106, with one end of a fourth bore 108 formed in the block $PV_1$, and the other end of the bore 108 opens through port 110 with the throat 84 intermediate the ends of the latter. As is seen in FIG. 6, the diameter of the fourth bore 108 is less than the diameter of the throat 84 and is materially smaller than the diameter of the bore 100.

One end of a first substantially hollow cylindrical air passage 112 (see FIGS. 1 and 4) opens into the plane of the closed end 71 of the recess 72, while the other end thereof extends substantially vertically downwardly to open into one end of a second air passage 114, the other end of the latter extending transversely of the block $PV_1$ and opening into the plane of the side 90 adjacent the upper right-hand corner thereof as viewed in FIG. 4.

First and second air vent passages 115, 116 extend transversely through the block $PV_1$ opening at one of their ends in the plane of the side 80 and at their respective other ends into the plane of the closed end 86 of the recess 88. Fastener receiving openings 118, 120 extend transversely through the block $PV_1$ adjacent the diagonal corners thereof to receive elongated screws 122 for effecting threaded connection with suitable recesses formed in the block $PV_3$ whereby the blocks $PV_1$ and $PV_3$ may be clampingly secured together. Other fastening means conventional in the arts may be utilized to effect the connection between the two blocks, $PV_1$ and $PV_3$, respectively.

Disposed within the first throat 84 is the elongated stem 124 of a first poppet valve 126 for the block $PV_1$. As this specification develops, reference will be made to other poppet valves all having identical construction characteristics. As is seen in FIG. 6, the stem 124 of the poppet valve 126 has an outside diameter appreciably smaller than the inside diameter of the throat 84 to permit freedom of movement of the valve and for the free flow of air therebetween in one operational position of the poppet valve 126 to which further reference will be made below. As is seen in FIG. 6, one end of the stem 124 is formed with an enlarged head 128 disposed in the recess 88, and the stem 124 adjacent its other end is formed with an arcuate circumferential recess 130 in which is fitted an O-ring seal 132. The length of the stem 124 is such that the head 128 may seat against the gasket 98 when the seal 132 is positioned at a point remote from its valve seat 94, and in a second position of the valve 126, the valve is movable to seat the seal 132 against the valve seat 94 and in so moving, the head 128 is displaced from its gasket 98. This is the position of the component parts of the valve 126 as illustrated in FIG. 6 and it will now be seen that the valve 126 in this position of its operation blocks high-pressure air from passing from the air inlet bore 76 to the air outlet bore 100. In the first of its described positions, the valve 126 will pass air under high pressure from the high-pressure supply or inlet bore 76 into the throat 84 from whence the high-pressure air will pass via the port 110, the air passage 108 into the high-pressure air outlet bore 100 for utilization.

A second poppet valve 134 is provided for the block $PV_1$ and comprises, as before, an elongated stem 136 having an enlarged head 138 at one end thereof disposed within the recess 72, and in one position of operation the head 138 may seat in its valve seat 74. The other end of the stem 136 is formed with an arcuately shaped outwardly opening circumferential groove 140 in which is secured an O-ring seal 142. The length of the stem 136 is such that with the head 138 seated in its valve seat 74, the seal 142 is displaced away from its valve seat shoulder 75. In a second operative position, the poppet valve 134 moves to seat the seal 142 against its adjacent shoulder 75 dislodging or disengaging the head 138 from its seat 74.

The block $PV_2$ includes upper and lower opposed planar ends 144, 146, respectively, having a centrally located internally threaded bore 148 which extends inwardly from the end 144 to open at its inner end into the adjacent inner end of a coaxially disposed elongated smooth counterbore 150, the outer or lower end of the counterbore 150 opening into the plane of the end 146. The lower end 146 is superimposed in juxtaposition relative to the upper end 73 of the block $PV_1$ with a thin flexible air-impervious diaphragm 152 interposed therebetween. Any conventional fastening means (screws, for example) not shown, may be employed to connect the block $PV_2$ on the block $PV_1$ with the diaphragm 152 clampingly engaged therebetween and spanning the recess 72, and as is seen in FIG. 2, the recess 72 has a diameter appreciably greater than the diameter of the throat 70. A beehive type helicoidal spring 154 is positioned within the counterbore 150 with the base end of the spring 154 abutting a portion of the diaphragm 52 contiguous to and which abuts the outer free end of the enlarged head 138 of the valve 134. Threaded into the bore 148 is an elongated externally threaded plug 156 having a slotted outer or upper head 158 to receive a tool blade (not shown) to effect axial adjustment of the plug 156. The plug inner or lower end of the plug 156 engages the apex end of the spring 154. The plug 156 is, of course, adjustable to vary the tension on the diaphragm 152, and consequently, the pressure on the valve 146. The plug 156 is also formed with a vent passage 160 which extends axially therethrough whereby the upper side of the diaphragm 152 vents to the atmosphere via the counterbore 150 and the vent passage 160.

Prior to the connection of the block $PV_1$ to the block $PV_3$ to which mention has been made above, a compound diaphragm 162 is disposed in and extends across the recess 88. The diaphragm 162 includes (see FIGS. 2, 6 and 7) a thin membrane 164 of any suitable geometric configuration to the sides of which, and centrally thereof, are secured by conventional means (not shown) reinforcing lightweight metallic discs 166, 168 of identical construction. The peripheral marginal edges of the membrane 164 overlap the groove 92 and an O-ring seal 170 disposed therein. The planar side 172 of the block $PV_3$ is drawn flush against the adjacent disc 168 as the screws 122 are tightened to clamp the peripheral marginal edge of the membrane 164 between the seal 170 and the planar side 172 of the block $PV_3$. From the drawings it is apparent that the area of the diaphragm 162 is smaller than that of the diaphragm 42.

The block $PV_3$ includes upper and lower planar ends 174, 176, respectively, and to the lower end 176 may be secured shim means 178 to provide suitable adjustment between the block $PV_3$ and the mounting plate 50. Suitable means, for example, the screw means 180 (see FIG. 3) may be utilized to connect the block PV₃ to the mounting plate 50.

The block PV₃ is provided with a first vertically extending bore 182 having a diameter somewhat smaller than the bore 62. The bore 182 is formed with a counterbore 184 internally tapped as at 186. The outer end of the tapped portion 186 opens into the plane of the upper end 174 of the block PV₃. The lower end of the bore 182 is reduced in diameter to form a throat 188 (see FIGS. 2 and 5) coaxially aligned with its associated bore 182. Inherently, and with the forming of the throat 188, there is also formed an internal seat 190 to which further reference will be made. The lower end of the throat 188 opens into the planar lower end 176 of the block PV₃, and at its circumferential marginal edge there is provided a downwardly opening arcuately shaped circumferential groove 192 which receives an O-ring seal 194 therein. An opening 196 extends transversely through the shim 178, the opening 196 being disposed in coaxial alignment with the throat 188, its associated bore 182, and the opening 56 of the mounting plate 50.

A first air passage 198 for the block PV₃ has one of its ends in open communication with the untapped portion of the counterbore 184, and at its other end, the first air passage 198 is in open communication with one end of a second air passage 200. The other end of the air passage 200 opens into the planar side 172 of the block PV₃ in confronting and open communication with the adjacent end of the air passage 114. The air passage 114 and the connecting air passages 112, 114 are substantially of the same diameter and each is, of course, of a diameter appreciably smaller than the diameter of the bore 182. As is seen in FIGS. 1 and 3, a sealing gasket 202 may be recessed into the planar side 172 of the block PV₃ at the circumferential marginal edge of the adjacent end of the air passage 200. A second air passage 204 (see FIGS. 2, 3 and 5) has one of its ends in open communication with the throat 188 and its other end opens into the plane of the side 172 of the block PV₃ to confront an adjacent side of the compound diaphragm 162.

A poppet valve 206 is provided for the throat 188, and this valve comprises an elongated stem 208 (see FIG. 5) having a diameter smaller than the diameter of the throat 188 and, as in the poppet valves heretofore described, the inner end of the stem 208 is formed with an outwardly opening arcuate circumferential groove 210 in which is seated an O-ring seal 212 which, in one position of the valve 206, seats against the seat 190. In this position, the enlarged head 214 formed at the other end of the stem 208 is disposed outwardly away from the seal or gasket 194. In a second position of the operation of the valve 206, the head 214 is moved into engagement with the seal or gasket 194 while the O-ring seal 212 is displaced away from its adjacent seat 190.

A fluidic system employing the valve assembly 10 is shown in FIG. 8. As is illustrated therein one end of a high-pressure air supply conduit 216 connects via a conventional fitting 218 with the tapped counterbore 78 of the high-pressure inlet bore 76, and a similar fitting (not shown) connects one end of the high-pressure air outlet conduit 220 with the tapped counterbore 102 of the high-pressure air outlet bore 100. The other end of the conduit 216 is connected to any suitable source of air under pressure (not shown), this being in the order of 60 to 125 p.s.i., and the other end of the conduit 220 may be connected to any conventional air-operated cylinder, motor or other machine, here designated in general by reference numeral 222. At 224 is indicated a T-coupler having a crosshead 226. One end of the crosshead 226 is threaded into the tapped counterbore 186, and the other end of the crosshead 226 connects with the air pressure gauge 228 of conventional construction. The stem 230 of the T-coupler 224 is connected to one end of a low-pressure air signal output conduit 232 which may be formed of any desirable flexible plastic material. The conduit 232 may, if desired, be provided with a conventional adjustable restrictor device 234 intermediate its ends. The other end of the conduit 232 is provided with a conventional jet air nozzle 236, and through adjustment of the plug 156 the air discharged from the nozzle 236 may be reduced, for operational purposes, to a pressure of ½ to 1 pound p.s.i.

Air discharged from the nozzle 236 is directed into the open end of an elongated air signal input conduit 238 spaced from the jet air nozzle 236, and the other end of the conduit 238 is connected by a conventional fitting 240 in open communication with the opening 24. Reference numeral 242 designates a workpiece or other control means which is movable between the nozzle 236 and the adjacent open end of the conduit whereby, with the workpiece 242 in its full line position of FIG. 8, communication of the jet air from the nozzle 236 to the conduit 238 is interrupted and upon subsequent movement of the workpiece 242, for example, to its dotted line position of FIG. 8, the jet airstream from the nozzle 236 to the conduit 238 is unobstructed.

In the fluidic system schematically illustrated in FIG. 1 of the drawings, the valve assembly 10 operates in the following manner.

The conduit 216 of this system is connected with a source of air under pressure (not shown) for supplying air under pressure in the order of 60 p.s.i. The plug 156 is adjusted to tension the spring 154 in such a manner as to exert a force on the diaphragm 152 and consequently, on the regulator valve 134 so as to reduce the air pressure in the recess 72 to, for example, substantially 1 p.s.i. Since the recess 72 is in open communication with the bore 182 through the air passages 112 and 114, the pressure in the bore 182 will also stand at substantially 1 p.s.i. The desired pressure may be read, of course, from the gauge 228. This air under reduced pressure is conducted from the bore 182 through the conduits 232 for discharge through the jet nozzle 236. With the workpiece 242 in its full line position of FIG. 1, the jet air discharge is blocked from entering the adjacent open end of the conduit 238 and the diaphragm 42 will now slack towards the end wall 18 enabling the poppet valve 206 to assume its closed position of FIGS. 2, 3 and 5 wherein the seal 212 seats against its valve seat 190. In so seating, the low-pressure air in the bore 182 is precluded from passing through the throat 188 and the passage 204 to impinge against the diaphragm 162. The valve 126 is, thus, held closed, that is, the seal 232 remains seated against its valve seat 94 effectively preventing high-pressure air from passing from the bore 76, the throat 84 and passage 108 for discharge into the high-pressure outlet bore 100.

Now if it be assumed that the workpiece 242 moves from its full line position of FIG. 8 to its dotted line position shown therein, the low-pressure jet air signal discharged from the nozzle 236 is conducted through the conduit 238 to the interior of the recess 16 below the diaphragm 42, which acts as an amplifier for this weak signal, to force the latter to move away from the end wall 18 and to raise the poppet valve 206. As the poppet valve 206 moves upwardly, its O-ring seal 212 is disengaged from its seat 190 whereby the low-pressure air in the bore 182 is admitted to the throat 188 to pass through the air passage 204 to the diaphragm 162 and causes the diaphragm 162 to move to the left as viewed in FIG. 2, and since the head 128 of the poppet valve 126 is engaged with the diaphragm 162, the poppet valve 126 will move in the same direction. As the poppet valve 126 is moved to unseat its seal 132 from its valve seat 94, high-pressure air passes from the bore 76 through the throat 84, the port 110, air passage 108 and port 106 into the high-pressure air discharge bore 100 from whence it is led through the conduit 220 to the machine or device 222. This condition will obtain until another workpiece or air-deflecting object 242 is again presented to the air discharge nozzle 236 in confronting relationship relative thereto. It should be observed at this point that when the poppet valve 206 is at its lower or closed position, one side of the diaphragm 162 vents to the atmosphere by way of the air passage 204, the throat 188 and opening 196, while the other side of the diaphragm 162 is in open communication at all times with the ambient atmosphere by way of the air vent passages 115, 116.

Having described and illustrated one embodiment of this invention in detail, it will be understood that the same is offered merely by way of example, and that this invention is to be limited only by the scope of the appended claims.

I claim:

1. Valve control means for connection in a high-pressure fluidic system and comprising:
a valve body having high fluid pressure inlet and outlet means formed therein;
first means in said valve body and connected with said inlet means to provide a low-pressure fluid source;
means connected with said source to constantly transmit a low-pressure signal;
first normally closed low fluid pressure responsive valve means in said body and disposed between said inlet and outlet means; and
second means responsive to said signal and operatively connected with said first valve means for applying said low-pressure fluid to said first valve means to actuate it to its open position and thereby establish communication between said high-pressure fluid inlet and outlet means.

2. A device of the type defined in claim 1 wherein said first valve means and said second signal responsive means include diaphragm actuated poppet valves.

3. A device as defined in claim 2 wherein:
said valve body includes means venting one side of the diaphragm of said first valve to the atmosphere; and
said signal responsive means includes means normally venting the opposed sides of the diaphragm of said second valve to the atmosphere in the absence of said signal.

4. Valve control means for connection in a high-pressure fluidic system and comprising:
a valve body having high fluid pressure inlet and outlet means formed therein;
first means in said valve body and connected with said inlet means to derive a low fluid pressure source therefrom and to constantly transmit a low fluid pressure signal;
first normally closed fluid pressure responsive valve means disposed in said valve body and interposed between said inlet and outlet means;
first fluid pressure responsive amplifying means in said valve body and connected on said first valve to actuate it to its open position upon the application of said low fluid pressure thereto, to thereby establish communication between said inlet and outlet means;
said valve body having means connecting said first amplifying means with said low fluid pressure source;
second normally closed fluid pressure responsive valve means in said valve body and disposed in said last named connecting means;
second low fluid pressure amplifying means in said valve body and operatively connected on said second valve means for actuating said second valve means to its open position and, consequently, to actuate said first valve means; and
means connected with said second amplifying means to receive and conduct said signal to said second amplifying means to effect its actuation, said last named means being positioned in the path of travel of said signal.